(12) United States Patent
Amery et al.

(10) Patent No.: US 6,678,098 B2
(45) Date of Patent: Jan. 13, 2004

(54) MULTIPLE LENS SUPPORT

(75) Inventors: John G. Amery, Elsberry, MO (US); Michael E. Stockton, Bland, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/175,018

(22) Filed: Jun. 18, 2002

(65) Prior Publication Data

US 2003/0231409 A1 Dec. 18, 2003

(51) Int. Cl.[7] .............................. G02B 7/02; G02B 3/08
(52) U.S. Cl. ................ 359/819; 359/811; 359/462; 359/741; 359/742; 434/38; 250/353
(58) Field of Search ................... 359/811, 819, 359/462, 457, 741, 742; 434/29, 38, 44; 345/1.3, 7; 348/36, 39, 121; 250/353

(56) References Cited

U.S. PATENT DOCUMENTS

| | | | | |
|---|---|---|---|---|
| 4,960,326 A | * | 10/1990 | Dauvergne | 359/741 |
| 5,311,024 A | * | 5/1994 | Marman et al. | 359/742 |
| 5,825,540 A | * | 10/1998 | Gold et al. | 359/462 |
| 6,152,739 A | * | 11/2000 | Amery et al. | 434/38 |

* cited by examiner

*Primary Examiner*—Loha Ben
(74) *Attorney, Agent, or Firm*—Black Lowe & Graham PLLC

(57) ABSTRACT

A support structure for a display system includes at least one pentagon-shaped lens, at least two hexagon-shaped lenses, and at least two hexagon-shaped supports. The at least two hexagon-shaped supports support the at least one pentagon-shaped lens and the at least two hexagon-shaped lenses. Each of the hexagon-shaped supports is securely attached to one of the hexagon-shaped lenses and one edge of the pentagon-shaped lens.

14 Claims, 4 Drawing Sheets

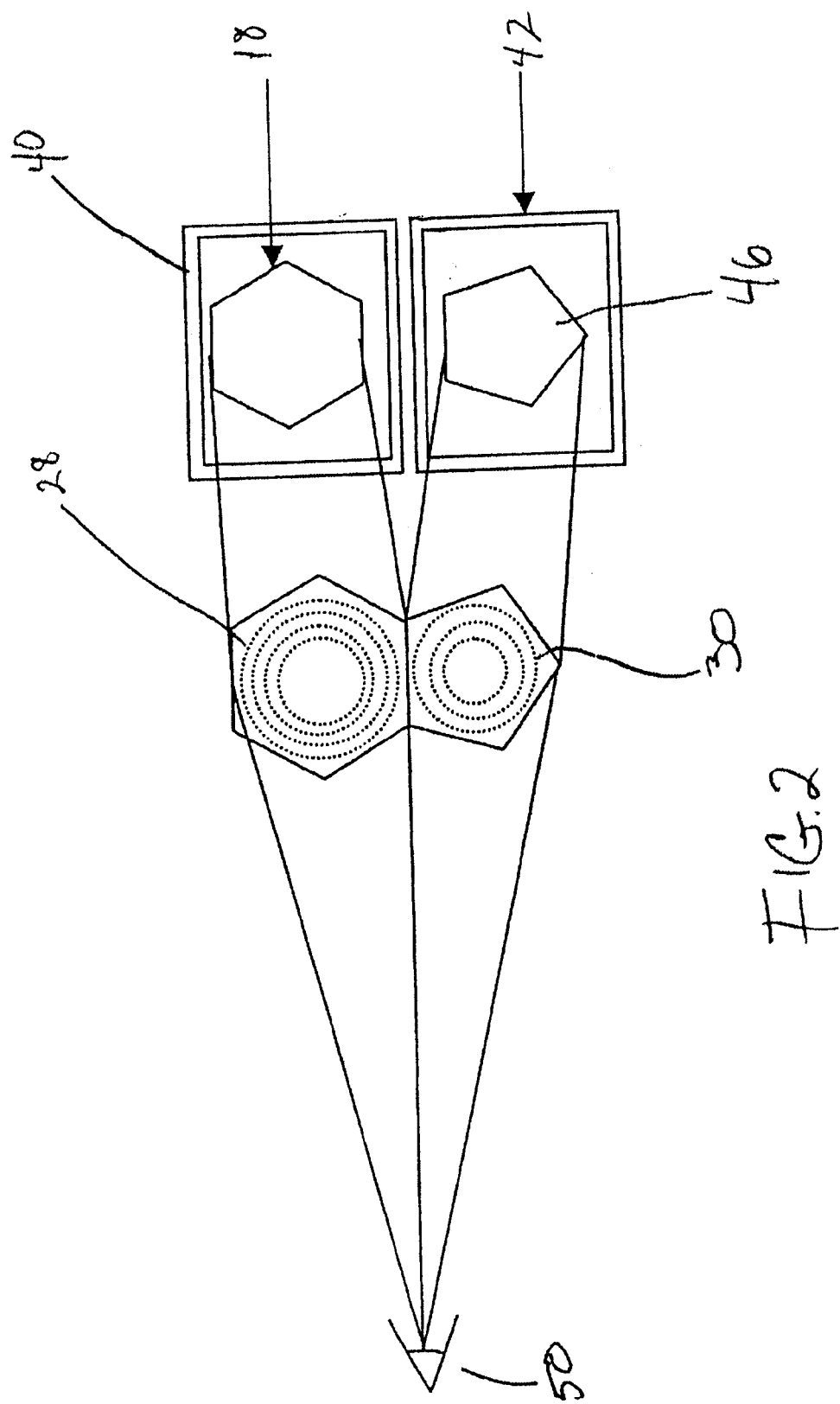

MULTIPLE LENS SUPPORT

FIELD OF THE INVENTION

This invention relates generally to display systems and, more particularly, to virtual display systems.

BACKGROUND OF THE INVENTION

A virtual display system requires a support structure for securely mounting a lens or group of lenses between a user and a display device. One possible approach to supporting a group of lenses in a virtual display would be to create a structure for each of the lenses. However, because the lenses have different shapes, manufacturing costs would be quite large in order to produce support structures for each of the lenses of the display system. Further, a structure for a lens may block a portion of the field of that lens. Therefore, there exists an unmet need in the art for a support structure that can accommodate differently shaped lenses of a virtual display system.

SUMMARY OF THE INVENTION

The present invention provides a support structure that supports differently shaped lenses of a display system without obscuring a field of view of any of the lenses, thus reducing manufacturing costs for the display system.

An embodiment of the present invention provides a support structure for a display system. The support structure includes at least one pentagon-shaped lens, at least two hexagon-shaped lenses, and at least two hexagon-shaped supports. The at least two hexagon-shaped supports support the at least one pentagon-shaped lens and the at least two hexagon-shaped lenses. Each of the hexagon-shaped supports is securely attached to one of the hexagon-shaped lenses and one edge of the pentagon-shaped lens.

Another embodiment of the present invention provides a display system that includes a plurality of display devices, at least one pentagon-shaped lens, at least two hexagon-shaped lenses, and at least two hexagon-shaped supports. The at least two hexagon-shaped supports support the at least one pentagon-shaped lens and the at least two hexagon-shaped lenses at a predetermined distance from the plurality of display devices. Each of the hexagon-shaped lenses is securely attached to one of the hexagon-shaped supports and one edge of the pentagon-shaped lens.

According to an aspect of the invention, each of the two or more hexagon-shaped supports suitably includes six support sides, and two of the six support sides may be approximately twice as thick as the other four of the six support sides. Thickness of the support sides may be based on a refraction value for the lenses.

BRIEF DESCRIPTION OF THE DRAWINGS

The preferred and alternative embodiments of the present invention are described in detail below with reference to the following drawings.

FIG. 2 illustrates visual perception of images in a visual system;

DETAILED DESCRIPTION OF THE INVENTION

By way of overview, an embodiment of the present invention provides a support structure for a display system. The display system includes at least one pentagon-shaped lens, at least two hexagon-shaped lenses, and at least two hexagon-shaped supports. The at least two hexagon-shaped supports support the at least one pentagon-shaped lens and the at least two hexagon-shaped lenses. Each of the hexagon-shaped supports is securely attached to one of the hexagon-shaped lenses and one edge of the pentagon-shaped lens.

Figure 1:
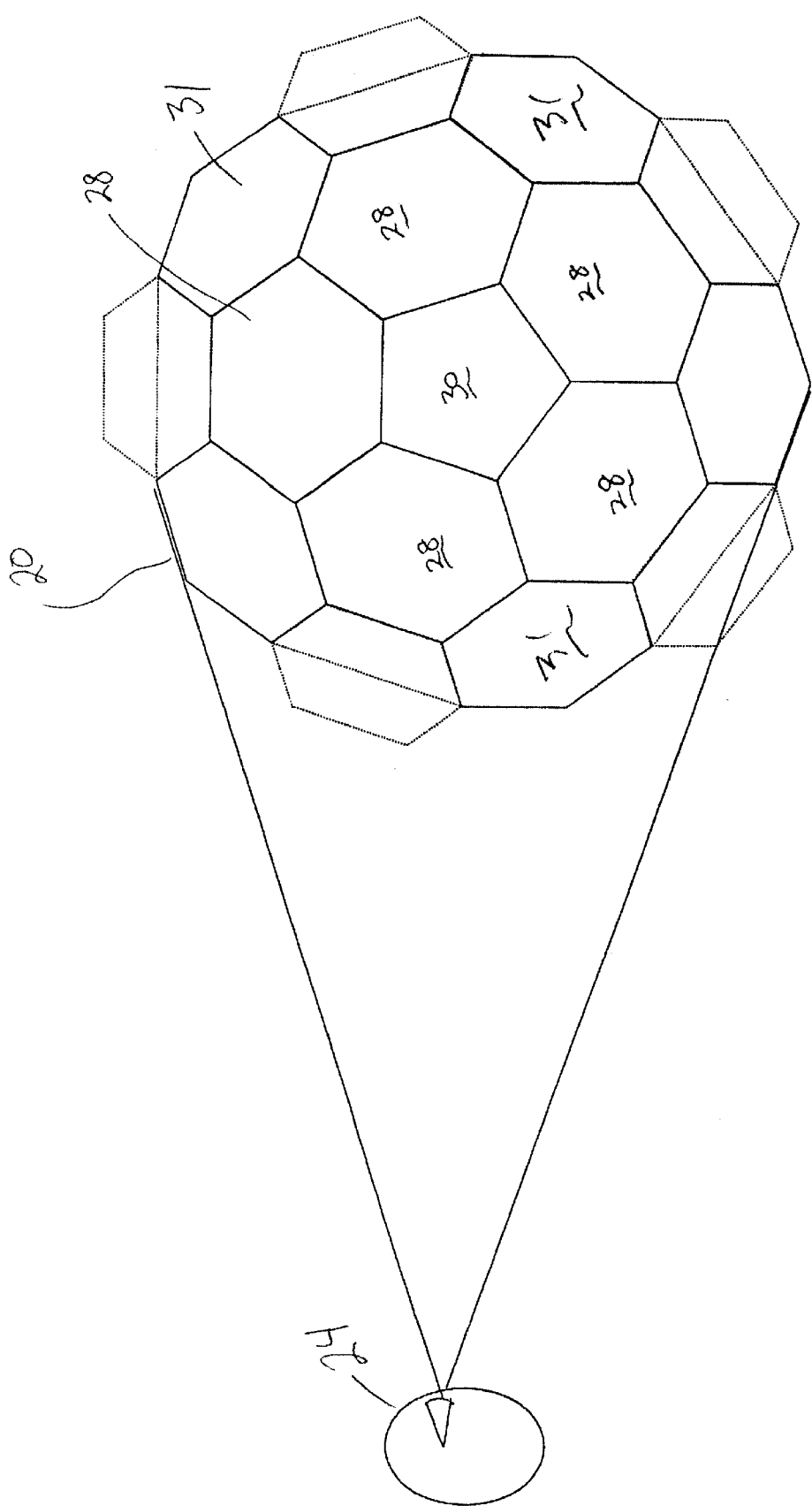
FIG. 1 illustrates a front view of the lenses of a visual system.

FIG. 1 illustrates a front view of a display 20, such as a multiple window bug-eye display. One non-limiting example of a suitable display is described in U.S. Pat. No. 6,152,739 issued to Amery et al. and assigned to the Boeing Company the contents of which are hereby incorporated by reference. The display 20 includes a plurality of hexagon-shaped lenses 28 attached to and encircling a pentagon-shaped lens 30. In an alternate embodiment, the display 20 includes other hexagon-shaped lenses 31 that surround the lenses 28 are of a slightly different shape than that of lenses 28. The lenses 28 and 30 are suitably Fresnel-type lenses. However, other type lenses, such as without limitation (examples), may also be used as desired for a particular application. The lenses 28 and 30 of the display 20 are preferably adjacent to each other in order to suitably provide a concave shape.

FIG. 2 illustrates a hexagon-shaped lens 28 that is positioned adjacent to the pentagon-shaped lens 30. Images 48 and 46 are presented on corresponding display devices 40 and 42, respectively. A viewer 50 perceives the image 48 from edge-to-edge of the lens 28 and the image 46 from edge-to-edge of the lens 30. The lenses 28 and 30 are mounted such that a support structure of the lenses 28 and 30 does not interfere with viewing of the images 48 and 46. The position and mounting direction of the lenses 28 and 30 allows the viewer to only view the corresponding shape of an image displayed within a corresponding display and not to view any border of either display.

Figure 3:
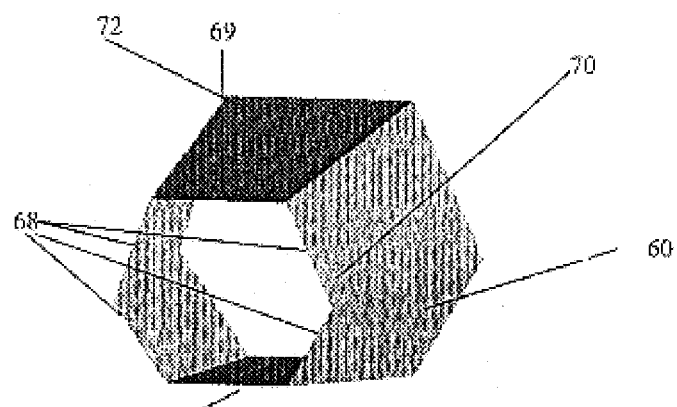
FIG. 3 illustrates a perspective view of a single support structure formed in accordance with the present invention.

FIG. 3 illustrates a perspective view of an exemplary single hexagon-shaped support structure 60, such as without limitation a non-symmetrical hexagon cone, that is designed to support one hexagon-shaped lens 28, one edge of a pentagon-shaped lens 30, and an edge of another pentagon-shaped lens or another hexagon-shaped lens 31. The hexagon-shaped structure 60 includes six sides. In one embodiment, the structure 60 includes four sides 68 of a first thickness, another side 66 of a second thickness 66. In one embodiment, the side 66 is about twice as thick as the sides 68. Thickness of the sides 66 and 68 may be selected as desired for a particular application. The last side 69 of the structure 60 has a third thickness, and in one embodiment is similar is size to that of side 66

The structure 60 has a first end 70 and a second end 72. The first end 70 provides a hexagon-shape that is smaller in area than a hexagon-shape provided at the second end 72. The hexagon-shaped lens 28 is mounted to the first end 70. At the side 66, the hexagon-shaped lens 28 advantageously occupies half of the available width of the side 66. The other, unoccupied half of the side 66 is used for mounting a side of the pentagon-shaped lens 30 or another hexagon-shaped lens 31.

Figure 4:
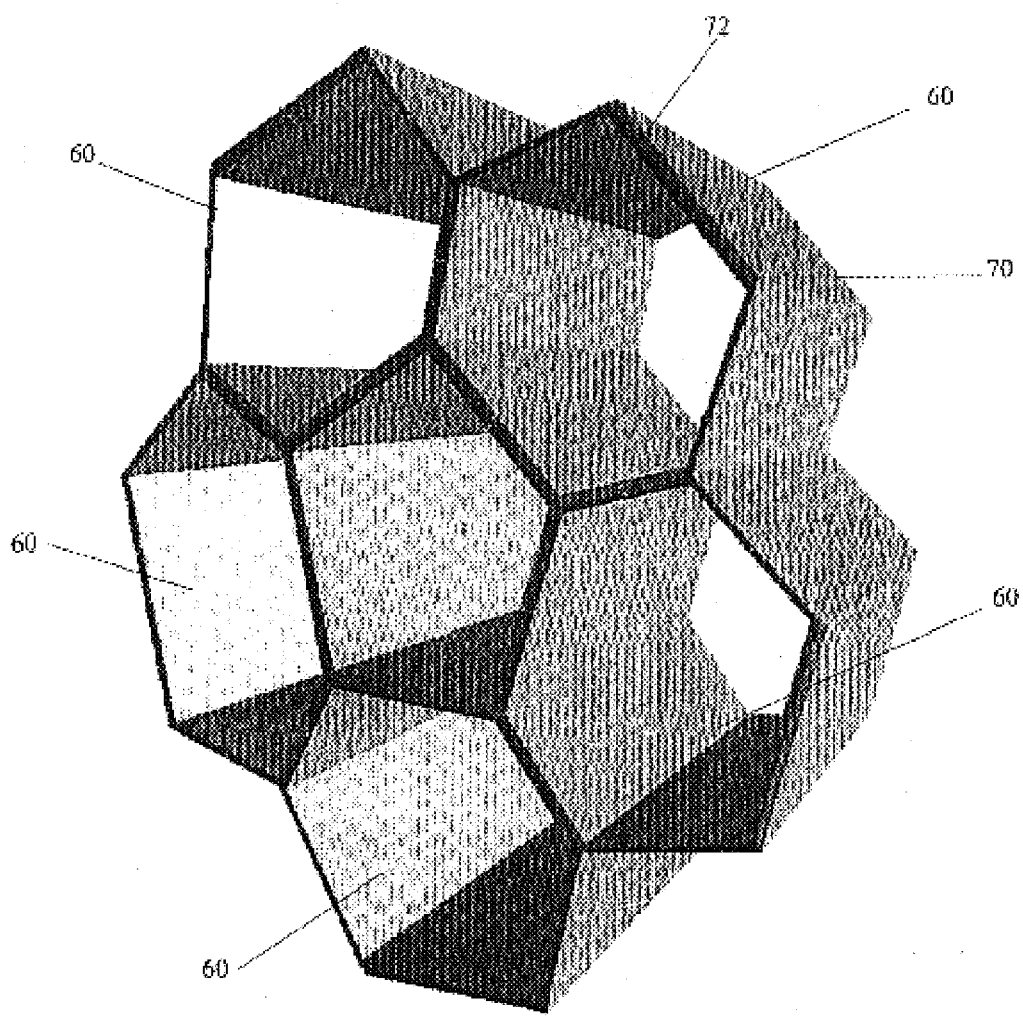
FIG. 4 illustrates a perspective view of a multi-cone support structure formed in accordance with the present invention.

Referring to FIG. 4, five cones 60 are positioned adjacent to each other to form a circle that defines a pentagon-shape within the formed circle. The sides 66 from each of the cones 60 is positioned to form the border of the pentagon-shaped center. Advantageously, the pentagon-shaped lens 30 is mounted between the five other hexagon-shaped lenses 28 and is secured to one of the sides 66 of each of the surrounding hexagon cones 60.

Figure 5:
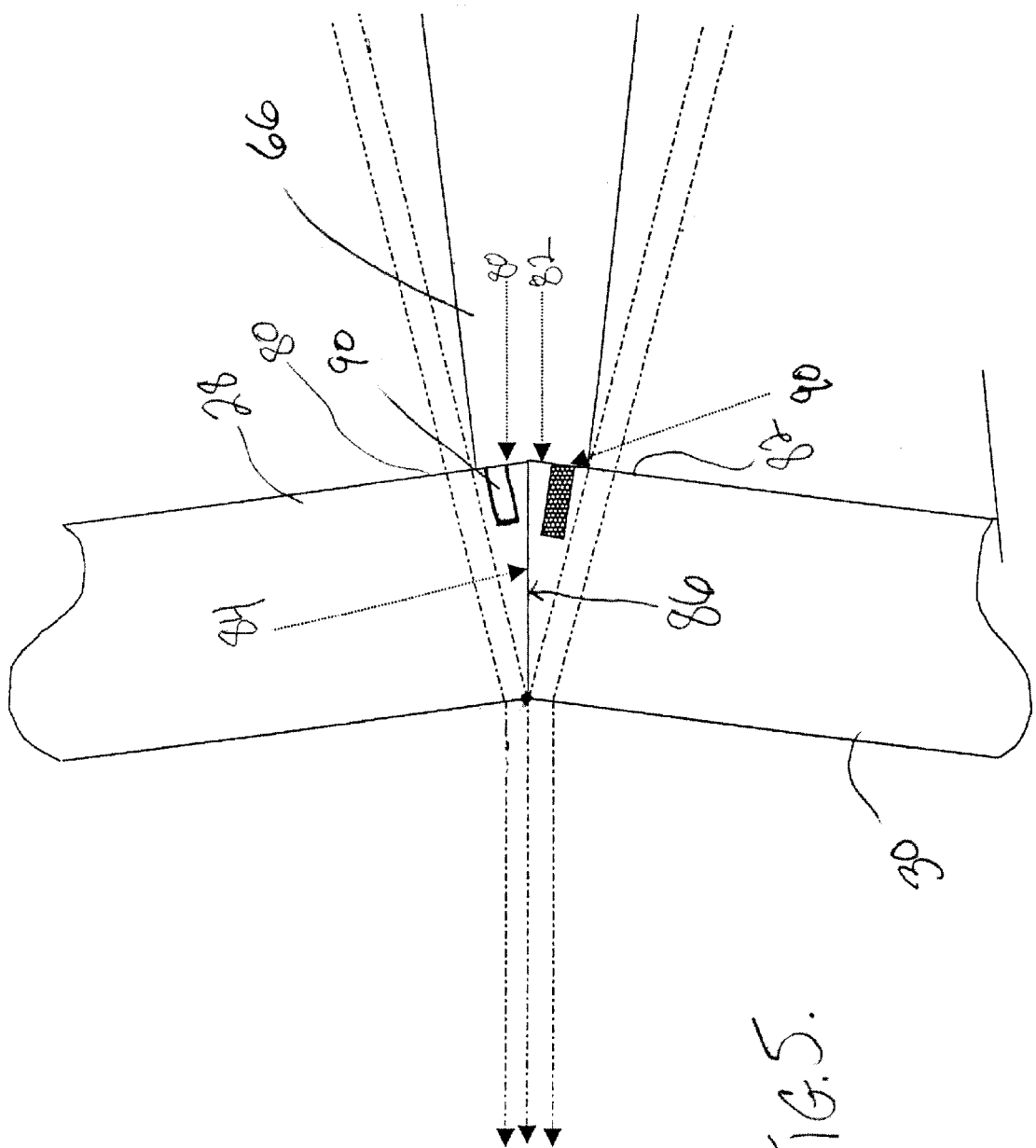
FIG. 5 illustrates a cutaway view of an edge of a support cone coupled to two Fresnel lenses.

FIG. 5 illustrates a cross-sectional view of a hexagon-shaped lens 28 and pentagon-shaped lens 30 attached to the side 66 of the support structure 60. First sides 80 and 82 of each of the lenses 28 and 30, respectively, closest to the support structure 60 are secured by securing mechanisms 90 at a point closest to each edge 84 and 86 of the lenses 28 and 30, respectively. Also, the edges 84 and 86 are secured to each other with an adhesive. The support structure 60 and the sides 66 are of sufficient width to allow for securing mechanisms 90 to secure each lens 28 and 30 without causing the structure 60 or side 66 to intrude on any portion of the images that are refracted by each lens from the respective displays 20 (FIG. 1). Thus, images from associated displays are not obstructed by the structure 60. The lenses 28 and 30 can be secured to the side 66 by a single key locking (pin) device located at the intersection of the two lenses 28 and 30 or by an adhesive. The side 66 is suitably concave shaped with 2 flat edges that receive each of the lenses 28 and 30 at predefined angles.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A structure comprising:
   at least one pentagon-shaped optical element;
   at least two hexagon-shaped optical element; and
   at least two hexagon-shaped supports for supporting the at least one pentagon-shaped optical element and the at least two hexagon-shaped optical elements,
   wherein each of the hexagon-shaped supports is securely attached to one of the hexagon-shaped optical elements and one edge of the pentagon-shaped optical element.

2. The structure of claim 1, wherein the optical elements are a Fresnel lens.

3. A display system comprising:
   a plurality of display devices;
   at least one pentagon-shaped lens;
   at least two hexagon-shaped lenses; and
   at least two hexagon-shaped supports for supporting the at least one pentagon-shaped lens and the at least two hexagon-shaped lenses at a predetermined distance from the plurality of display devices,
   wherein each of the hexagon-shaped supports is securely attached to one of the hexagon-shaped lenses and one edge of the pentagon-shaped lens.

4. The system of claim 3, wherein each of the at least two hexagon-shaped supports includes six support sides, wherein two of the six support sides are approximately twice as thick as the other four of the six support sides.

5. The system of claim 4, wherein thickness of the support sides is based on a refraction value for the lenses.

6. The system of claim 3, wherein the at least two hexagon-shaped supports include six support sides, wherein one of the six support sides is approximately twice as thick as the other five of the six support sides.

7. The system of claim 6, wherein thickness of the support sides is based on a refraction value for the lenses.

8. The system of claim 3, wherein the predetermined distance is based on a distance of a viewer.

9. The system of claim 3, wherein the hexagon-shaped supports are coupled to the lenses in order to not block an image as viewed through the lens that is presented on the display devices.

10. A method of adjacently positioning lenses in a display system, the method comprising:
    providing a support structure;
    securing a hexagon-shaped lens to the support structure; and
    securing one edge of a pentagon-shaped lens to the support structure.

11. The method of claim 10, wherein the support structure includes six support sides, wherein two of the six support sides are approximately twice as thick as the other four of the six support sides.

12. The method of claim 11, wherein thickness of the support sides is based on a refraction value for the lenses.

13. The method of claim 10, wherein the support structure includes six support sides, wherein one of the six support sides is approximately twice as thick as the other five of the six support sides.

14. The method of claim 13, wherein thickness of the support sides is based on a refraction value for the lenses.

* * * * *